United States Patent
Diab (10) Patent No.: US 8,553,549 B2
(45) Date of Patent: *Oct. 8, 2013

(54) SYSTEM AND METHOD FOR ADJUSTING COMPRESSION FOR COMPUTING CLIENTS BASED ON A LATENCY LEVEL

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 13/034,434

(22) Filed: Feb. 24, 2011

(65) Prior Publication Data

US 2011/0145442 A1 Jun. 16, 2011

Related U.S. Application Data

(63) Continuation of application No. 11/836,848, filed on Aug. 10, 2007, now Pat. No. 7,929,553.

(51) Int. Cl.
*G06F 11/00* (2006.01)

(52) U.S. Cl.
USPC ............ 370/235; 370/401; 370/477; 709/247

(58) Field of Classification Search
USPC .......................... 370/235, 401, 477; 709/247
See application file for complete search history.

(56) References Cited

U.S. PATENT DOCUMENTS

| | | | |
|---|---|---|---|
| 5,164,938 A | 11/1992 | Jurkevich et al. | |
| 5,282,207 A | 1/1994 | Jurkevich et al. | |
| 5,388,097 A | 2/1995 | Baugher et al. | |
| 5,608,653 A | 3/1997 | Palmer et al. | |
| 5,848,266 A | 12/1998 | Scheurich | |
| 6,014,694 A | 1/2000 | Aharoni et al. | |
| 6,115,372 A | 9/2000 | Dinha | |
| 6,212,200 B1 | 4/2001 | Iizuka et al. | |
| 6,233,226 B1 | 5/2001 | Gringeri et al. | |
| 6,385,673 B1 | 5/2002 | DeMoney | |
| 6,618,363 B1 | 9/2003 | Bahl | |
| 6,862,265 B1* | 3/2005 | Appala et al. | 370/235 |
| 6,987,753 B2 | 1/2006 | Liu et al. | |
| 7,031,259 B1 | 4/2006 | Guttman et al. | |
| 7,075,927 B2 | 7/2006 | Mo et al. | |
| 7,319,667 B1* | 1/2008 | Biederman | 370/231 |
| 7,394,815 B1 | 7/2008 | Suzuki | |
| 7,466,652 B2 | 12/2008 | Lau et al. | |
| 7,602,723 B2 | 10/2009 | Mandato et al. | |
| 8,024,483 B1* | 9/2011 | Rothstein et al. | 709/247 |
| 2001/0048670 A1 | 12/2001 | Kelly et al. | |
| 2005/0120128 A1 | 6/2005 | Willes et al. | |
| 2005/0169314 A1 | 8/2005 | Beaudoin et al. | |
| 2007/0030833 A1 | 2/2007 | Pirzada et al. | |

(Continued)

OTHER PUBLICATIONS

Michael J. Teener, "Ethernet AV™ Summary," Apr. 2006.

(Continued)

*Primary Examiner* — Wanda Z. Russell
(74) *Attorney, Agent, or Firm* — Duane S. Kobayashi (57) ABSTRACT

A system and method for adjusting a level of compression for endpoint devices. Endpoint devices in a network can stream audio/video traffic over a network. Such a connection between the endpoint devices can be reserved with guarantees of latency being obtained. Latency guarantees across multiple intermediary switches can be used to define a compression level for the end devices.

16 Claims, 5 Drawing Sheets

(56) References Cited

U.S. PATENT DOCUMENTS

| | | |
|---|---|---|
| 2008/0049787 A1 | 2/2008 | McNaughton et al. |
| 2008/0077702 A1 | 3/2008 | Posamentier |
| 2008/0101405 A1 | 5/2008 | Wirick et al. |
| 2009/0033739 A1 | 2/2009 | Sarkar et al. |
| 2009/0037606 A1 | 2/2009 | Diab |
| 2009/0041042 A1 | 2/2009 | Diab |
| 2009/0119736 A1 | 5/2009 | Perlman et al. |
| 2009/0122878 A1 | 5/2009 | Liu et al. |
| 2009/0213927 A1 | 8/2009 | Perlman et al. |
| 2009/0279550 A1 | 11/2009 | Romrell et al. |

OTHER PUBLICATIONS

Michael J. Teener, "AV Bridging and Ethernet AV™," Mar. 2007.

Foster et al., "RFC 3661," Dec. 1, 2003.

* cited by examiner

SYSTEM AND METHOD FOR ADJUSTING COMPRESSION FOR COMPUTING CLIENTS BASED ON A LATENCY LEVEL

This application is a continuation of non-provisional application Ser. No. 11/836,848, filed Aug. 10, 2007, which is incorporated by reference herein, in its entirety, for all purposes.

BACKGROUND

1. Field of the Invention

The present invention relates generally to Ethernet networks and, more particularly, to a system and method for adjusting compression for computing clients based on a latency level.

2. Introduction

Client-server applications typically involve numerous tradeoffs regarding the various levels of processing to be performed on the client and the server. This decision can greatly influence the relative cost of the clients and servers.

One type of client is a thin client. A thin client can be designed with relatively little processing power such that the bulk of the data processing occurs on the server. The thin client can therefore be designed to focus on conveying input and output between the user and the application. This framework can be used in a server-centric computing model. In contrast, a thick client can be designed with significant processing power. Here, the thick client can be responsible for much of the data processing, while the server is largely responsible for centralized storage and control.

In between the thin and thick client classifications there can exist various hybrid clients. These hybrid clients can exhibit both thin and thick client properties depending on the particular function of the client device. In many instances, a thin client can be turned into a "chubby" client through the inclusion of additional processing capacity for a particular application. For example, compression circuitry and software can be added to a thin client to transform it into a chubby client.

One area of application of such client computing devices is in the transmission of streaming audio/video (AV). As would be appreciated, this transmission can occur in various wide area network (WAN), metropolitan area network (MAN), and local area network (LAN) contexts.

Many AV streams (e.g., video conferencing) can represent latency-sensitive traffic. For this type of traffic, compression and decompression of the AV stream between the two endpoints can take up a large part of the latency budget, thereby compromising end-to-end delay targets. In some cases, endpoint devices can seek to minimize the level of compression to meet worst-case assumptions used to address the unpredictable nature of network performance. While this process increases the likelihood of meeting end-to-end delay targets, it is not based on actual network performance. What is needed therefore is a mechanism for managing such endpoint devices in their efficient use of available network end-to-end delay budgets.

SUMMARY

A system and/or method for adjusting compression for computing clients based on a latency level, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet networks have become ubiquitous in their deployment across corporate and residential markets. Ethernet networks have therefore benefited from the significant reduction in costs afforded by the growing economies of scale. Levels of network traffic are expected to increase, meaning that typical network connections will increasingly support 1000BASE-T, 10 GBASE-T and beyond. Typical network connections also include wireless network links as well.

The limitations of network resources are often viewed in terms of bandwidth as an increasing number of applications compete for the same network resources. Some applications produce "bursty" traffic with high bandwidth, such as in the transfer of large files. Other applications involving audio/video (AV) traffic can produce a distributed stream of data. Regardless of the type of traffic and application, one of the ways of dealing with a bandwidth-limited situation is to use some form of compression to lower the amount of data that is transmitted over the network.

While compression does enable the traffic to fit into the available bandwidth, compression does come at a cost in terms of processing-induced delays. These processing-induced delays can render the compression unfit for use with various forms of latency-sensitive traffic. One example of such latency-sensitive traffic is video conferencing traffic, which can be extremely sensitive to any form of delay or time synchronization issue.

In general, the greater the level of compression, the greater the level of delay budget that is used for the compression function. Accordingly, one of the major issues in accommodating latency-sensitive traffic is the identification of the appropriate level of compression to be used. Clearly, the transmission of uncompressed traffic would be ideal, but would assume unlimited amounts of available bandwidth. Some level of compression would therefore be used in most instances.

In conventional applications, the level of compression is chosen to meet some worst-case estimate of the latency budget or latency requirements are ignored/sacrificed and the compression is based on worst-case bandwidth requirements. This often unnecessarily sacrifices the amount of compression that can be used due to worst-case assumptions of the network. While an estimate of the amount of latency between endpoint devices could potentially be obtained through various measurements, the estimate would typically be inaccurate when considering the dynamic changes in network performance over the course of transmission.

It is a feature of the present invention that available compression levels can be chosen based on reliable indicators of network latency. Here, the usage of reliable indicators of network latency enable the devices to use greater levels of compression without concern that the resulting processing-induced delay will produce an overrun in the end-to-end delay budget.

In one embodiment, the network latency information is obtained upon application of a connection reservation protocol. Here, the connection reservation protocol is operative to reserve a connection with a certain bandwidth and latency for the duration of the connection between endpoint devices. In general, guaranteeing bandwidth in a connection is necessary but not sufficient due to the increasing importance of latency considerations in current and future applications. One example of a connection reservation protocol is AV bridging technology, which can be applied to AV streaming across the network. In general, AV bridging such as that described in IEEE 802.1 has been developed to reserve a connection with a certain quality of service (QoS). In this process, a bandwidth reservation protocol and a time synchronization protocol would be implemented to reserve a connection with guaranteed levels of bandwidth and latency. As would be appreciated, additional functionality such as encryption and compression can also be incorporated.

As noted above, latency is a significant issue. As such, the connection reservation protocol can include the periodic exchange of timing information that would allow both ends of the link to synchronize their time-of-day clock precisely. In one embodiment, different granularities can be used to meet different traffic classes. For example, 125 µs periods (used in most current isochronous transports) can be used for low latency streams, while 1 ms periods can be used for moderate latency streams.

During link establishment, endpoint devices would exchange capability information. If the devices have the same network synchronization capability, the devices would then exchange configuration and clock synchronization information. Bridges between the devices would similarly be involved in the exchange of configuration and synchronization information. If all links in the connection between the endpoint devices can support network synchronization, then the connection having a certain QoS can be reserved. In contrast, if one of the links in the connection between the endpoint devices cannot support network synchronization, then the connection having a certain QoS cannot be reserved.

Figure 1:
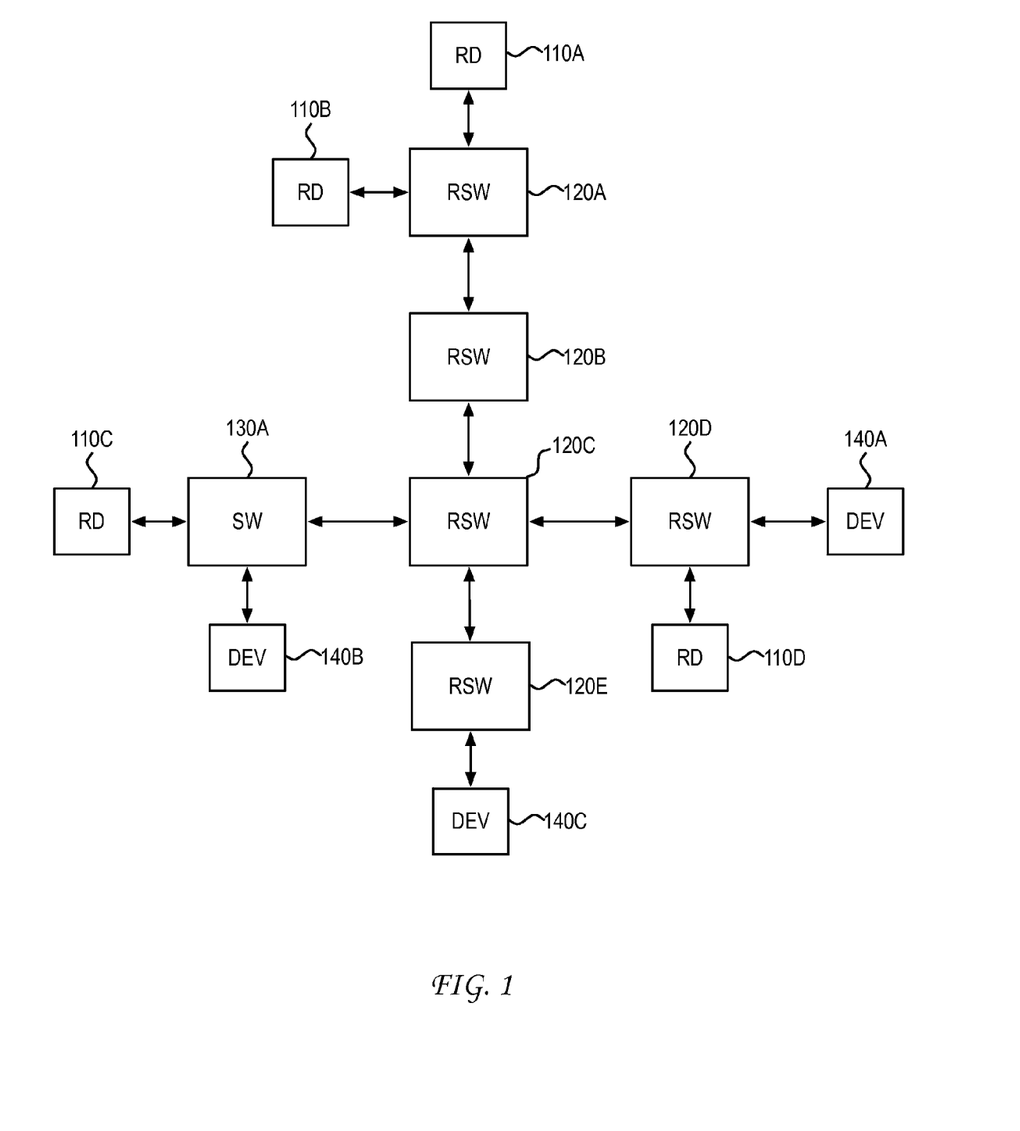
FIG. 1 illustrates an example of an Ethernet network that enables connectivity of client and server devices.

FIG. 1 illustrates an example of a network that supports connections between multiple devices. Two types of devices are shown in this example, reservation devices (RDs) 110A-110D and conventional Ethernet devices (DEVs) 140A-140C. Here, RDs 110A-110D represent Ethernet devices that would support network synchronization, while DEVs 140A-140C represent Ethernet devices that would not support network synchronization. As illustrated, RDs 110A-110D and DEVs 140A-140C are connected via various network switches. Two types of switches are shown in this example, reservation switches (RSWs) 120A-120D and conventional switch (SW) 130A. Here, RSWs 120A-120E are switches that would support network synchronization, while SW 130A is a switch that would not support network synchronization.

As noted, a connection having a certain QoS can be reserved only if the devices and switches in the link all have network synchronization capability. If any of the devices or switches do not support the exchange of configuration and clock synchronization information, then only a non-guaranteed connection can be established.

With this framework, RD 110A could establish a guaranteed QoS connection with ED 110D, since RDs 110A and 110D are supporting peer devices, and switches 120A-120D are supporting switches. In this connection setup process if the needed bandwidth is not available, then the amount of bandwidth that is available can be identified. In contrast, RD 110A could not establish a guaranteed QoS connection with DEV 140A because DEV 140A is a non-supporting peer device. Also, RD 110A could not establish a guaranteed QoS connection with RD 110C because SW 130A is a non-supporting switch. For these latter two examples, only a non-guaranteed connection can be established.

It should be noted that the network arrangement of FIG. 1 can be applied to various residential and non-residential applications (e.g., AV studio). In these various applications, the RSWs need not be dedicated switches. Rather, the RSWs can be embodied in an AV or other dedicated devices that has multiple Ethernet ports and switching functionality. For example, an AV device such as a computing device can be designed to function as both an RD and as an RSW. In general, any multi-port device (e.g., television, DVD player, set top box, gateway, media PC, etc.) can be used as a hub-like device in the network.

Figure 2:
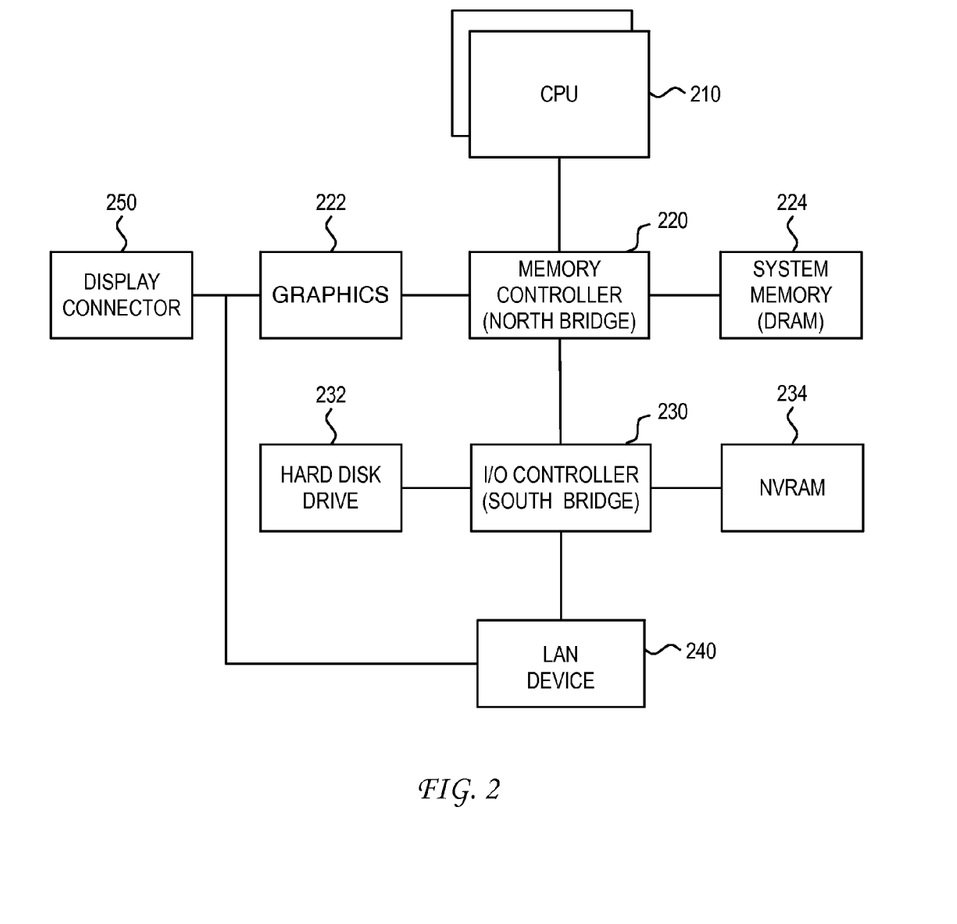
FIG. 2 illustrates an embodiment of a computing device.

FIG. 2 illustrates one embodiment of an endpoint device. In the illustration of FIG. 2, the endpoint device includes conventional computing components such as CPU(s) 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232 and nonvolatile RAM (NVRAM) 234.

As FIG. 2 further illustrates, I/O controller 230 is also in communication with LAN device 240. In general, LAN device 240 provides networking functionality such as that provided by a conventional network interface card (NIC). As LAN device 240 can be designed to support one or more Ethernet ports, LAN device 240 would include one or more media access controllers (MACs) (e.g., 100, 1G, 2.5G+), a PCI Express bus interface, on-chip buffer memory, and one or more integrated physical layer (PHY) transceivers.

As further illustrated, the endpoint device includes a display connector 250 (e.g., DisplayPort, HDMI, DVI, analog, etc.). Display connector 250 enables the endpoint device to display video content (e.g., HDTV) or any other multimedia traffic on an external display device coupled to display connector 250. The video signal is also coupled to LAN device 240.

Figure 3:
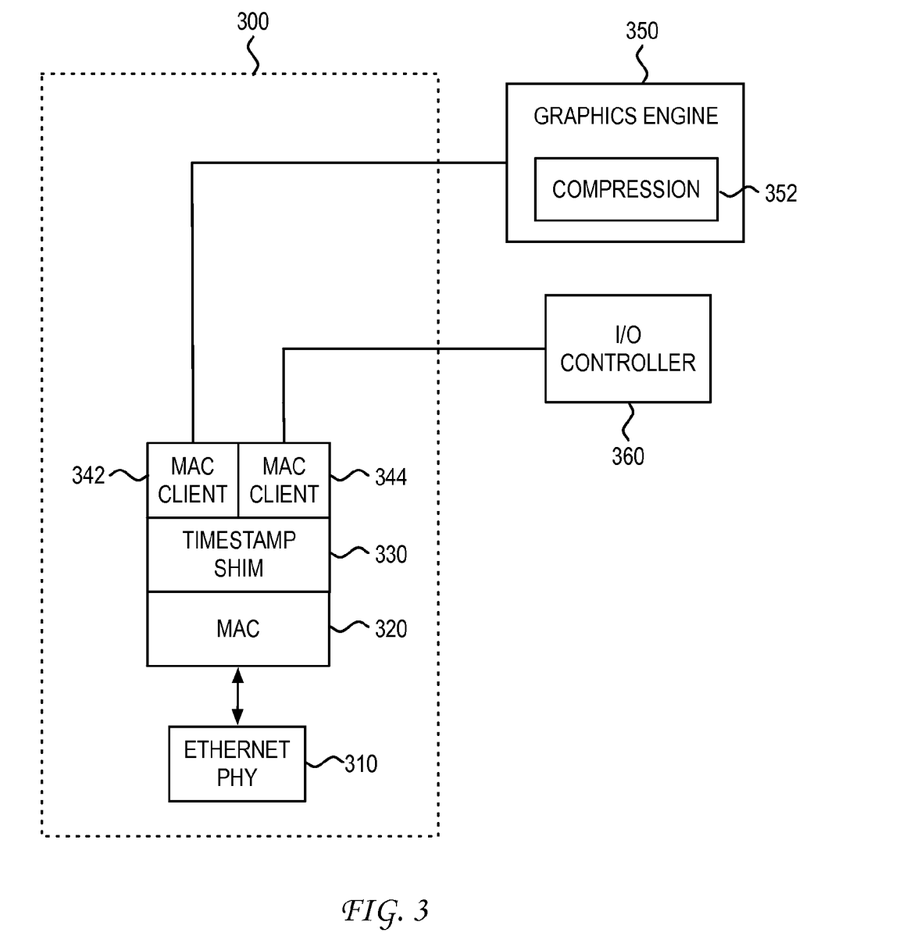
FIG. 3 illustrates an embodiment of a LAN device.

FIG. 3 shows a detailed view of an embodiment of an example LAN device. As illustrated, LAN device 300 interfaces with graphics engine 350 and I/O controller 360. Interfaces with graphics engine 350 and I/O controller 360 are enabled via MAC clients 342 and 344, respectively. Ethernet signals that are passed to/from MAC clients 342 and 344 are facilitated by MAC 320 and PHY 310. Also shown is timestamp shim 330, which is responsible for marking the traffic to ensure the bandwidth and latency guarantees through the network.

As illustrated, graphics engine 350 includes compression module 352. In various embodiments, compression module 352 can be implemented in hardware, software, or firmware and produce variable or fixed forms of compression. In this configuration, graphics engine 350 can be applied to native video or encapsulated HDMI, DisplayPort, DVI, etc. Encryption can also be used as needed by the particular implementation. In addition to handling best effort Ethernet traffic, I/O controller 360 can also be used for latency-sensitive audio or other latency-sensitive multimedia traffic. As such, I/O controller 360 could also include compression functionality as well.

In an alternative embodiment, I/O controller 360 is designed to only handle best effort Ethernet traffic, while graphics engine 350 is a multimedia engine designed to handle all multimedia traffic. In this arrangement, the multimedia engine can receive such traffic from the north bridge or south bridge or from any other source either directly or indirectly.

As noted, the endpoint device can be used as an RD or RSW. When operating as an RD, the endpoint device would rely on timestamp shim 330 and a traffic classifier and scheduler in the MAC client. When operating as a RSW, the endpoint device would contain multiple MACs and PHYs, while also including admission controller, frame filtering/routing, and time synchronization services. Additional details of such services are exemplified by IEEE 802.1AS, which provides a time synchronization protocol; IEEE 802.1Qat, which provides a stream reservation protocol; and IEEE 802.1Qav, which provides for guaranteed latency and bandwidth for established streams.

As would be appreciated, the example embodiments of FIGS. 2 and 3 are not intended to be exhaustive or limiting. Various other memory controller and I/O controller configurations can be used with the principles of the present invention. In supporting guaranteed QoS connections, however, it is significant that the RD identifies a latency level as part of the reservation process. It is a feature of the present invention that this identified level of latency can be used in determining how best to use the latency budget that has been reserved. As will be described in greater detail below, knowledge of the available latency would enable devices to choose an appropriate level of compression.

In conventional systems, devices do not have a priori knowledge of the latency that will be available for streaming of data. In assessing the network, the devices would often assume a typical connection. Where the nature of the streaming traffic dictates that delivery guarantees are needed, the server must then assume a worst-case connection and transmit in accordance with that assumption. Reliance on worst-case assumptions typically result in less than optimal performance.

For example, if the end devices assume a worst-case connection latency, the endpoint devices may need to assume that minimal to no compression should be used. Not only would this low compression result in a potential waste of bandwidth, but the available latency would also not be efficiently utilized. This represents poor network utilization.

In accordance with the present invention, latency reservation information is used to determine how best to leverage available network resources through the selective utilization of computing resources in thin, chubby, or thick clients. To illustrate this impact, reference is now made to the flowchart of FIG. 4. As illustrated, the process begins at step 402, where a level of compression is chosen for a particular stream of data. In various scenarios, this choice of compression level can be made based on some bandwidth or other quality assessment. At step 404, the latency budget needed to accommodate the level of compression of the stream of data would then be identified. Next, at step 406, a connection having a bandwidth and the level of latency needed to accommodate the determined latency budget is requested between the endpoint devices. In one embodiment, the connection bandwidth and latency reservation is made through one or more bridges/switches in accordance with AV bridging technology such as that described above. As the reserved latency is preserved until the connection is released, the endpoint devices are assured that the reserved latency level will persist throughout the lifetime of the connection.

Figure 4:
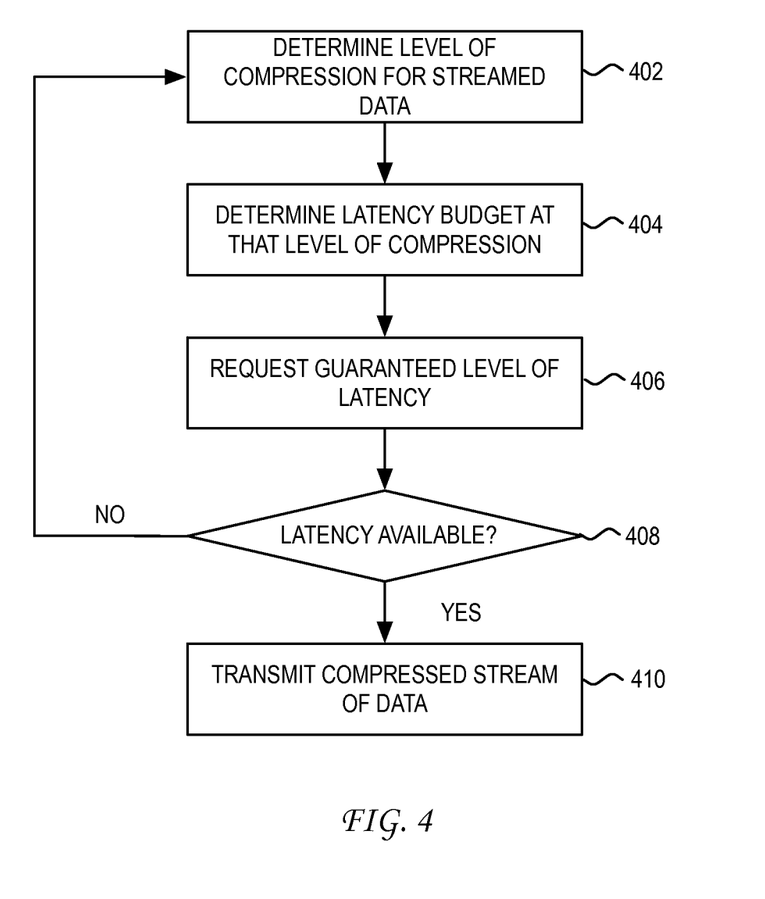
FIGS. 4 and 5 illustrate flowcharts of processes of compressing a stream of data.

At step 408, it is then determined whether a connection having the requested level of latency is available between the endpoint devices. If a connection having the requested level of latency is available, then the process would continue to step 410 where the compressed streamed data is transmitted over the reserved connection. In various embodiments, this compression can be effected in hardware or software.

If, on the other hand, a connection having the requested level of latency is not available, then the process would loop back to step 402, where a new level of compression is determined. In this process, a lower level of compression can be selected, such that the delay produced by the compression is reduced. For example, assume that five compression levels are available to the endpoint devices, with the highest rate of compression representing level 5 and the lowest rate of compression representing level 1. The endpoint devices could initially choose compression level 3. If the connection latency request for compression level 3 is denied, then the endpoint devices could examine lower rates of compression (i.e., levels 1 or 2) that would require less of a delay budget for compression processing. With the compression processing requiring less of a delay budget, the remainder of the end-to-end delay budget would increase. In effect, a less sensitive latency network connection can then be requested. In general, the process of FIG. 4 would continue until a level of compression is selected that would fit into a guaranteed level of latency between endpoint devices. In one embodiment, if no level of compression would fit into the latency budget, then the user can be informed that the connection is either denied or not guaranteed. For non-guaranteed connections a desired level of compression would be used.

Figure 5:
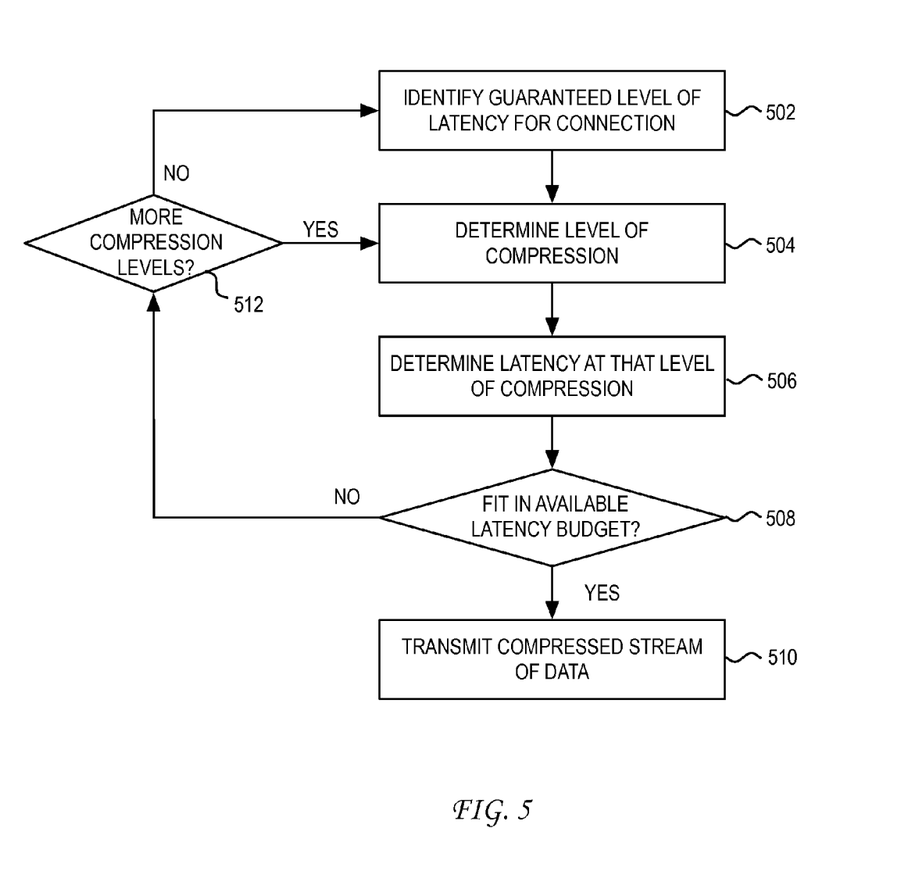

FIG. 5 illustrates another example of a process of selective utilization of computing resources based on latency. As illustrated, the process begins at step 502 where a guaranteed level of latency is identified. After the latency budget is identified, a level of compression is chosen for a particular stream of data at step 504. Next, at step 506, the latency produced by the chosen level of compression is identified. At step 508, it is then determined whether the identified latency would fit in the latency budget.

If it is determined that the identified latency would fit in the available latency budget, then the compressed stream of data is transmitted at step 510. If, on the other hand, it is determined at step 508 that the level of latency would not fit in the available latency budget, then a lower compression level must be used. The process then continues to step 512 where it is determined whether lower compression levels are available. If it is determined that lower compression levels are available, then the process would continue at step 504 where a lower compression level is selected. If, on the other hand, it is determined that lower compression levels are not available, then the process would loop back to step 502 where a less sensitive latency connection is requested from the network. If the network is not able to accommodate a less sensitive latency connection, then the user can be informed that the connection is either denied or not guaranteed. For non-guaranteed connections a desired level of compression would be used.

As has been described, the adjustment of the level of compression can be chosen based on the available latency identified using a connection reservation protocol. In various embodiments, this connection reservation protocol can be static or dynamic. With a dynamic connection reservation protocol, changes in the guaranteed connection could occur midstream. In this case, the end devices could also be designed to adjust the compression level dynamically.

It should also be noted that while the present invention has been described in the context of wired networks, the principles of the present invention would also apply to wireless networks. Additionally, the principles of the present invention can be applied to any network carrying traffic that can be streamed and/or compressed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A network communication method, comprising:
    prior to a transport of an audio/video stream, reserving a connection with a guaranteed level of latency for said transport between a first endpoint device and a second endpoint device, said reservation being performed across one or more bridge devices between said first and second endpoint devices;
    prior to an initiation of said transport, choosing a compression level having an associated latency level that can be accommodated by said reserved level of latency of said connection;
    compressing said audio/video stream at said chosen level of compression; and
    transmitting said compressed audio/video stream from said first endpoint device to said second endpoint device.

2. The method of claim 1, wherein said reserving comprises performing a time synchronization for a connection across said one or more bridge devices.

3. The method of claim 1, wherein said reserving comprises reserving a connection bandwidth.

4. The method of claim 1, wherein said choosing comprises choosing a maximum level of compression that would enable said transport to fit in an end to end delay budget.

5. The method of claim 1, wherein said audio/video stream is a video conferencing stream.

6. The method of claim 1, wherein said first and second endpoint devices are computing devices.

7. A network device, comprising:
    a controller that identifies a level of latency that has been reserved for a connection between the network device and an endpoint device, said level of latency being reserved across one or more switches between the network device and said endpoint device; and
    a compression module designed to compress traffic for transmission over said connection, said compression module being responsive to said controller in choosing a compression level based on said level of latency that has been reserved across said one or more switches.

8. The network device of claim 7, wherein said traffic is an audio/video stream.

9. The network device of claim 7, wherein said traffic is a video conference.

10. The network device of claim 7, wherein said compression module is a graphics subsystem.

11. The network device of claim 7, wherein said compression module is a processor.

12. A network communication method, comprising:
    requesting a reservation for a connection that traverses one or more bridge devices between a first and a second endpoint device, said request including an identified level of latency, wherein said request is based on a first level of compression; and
    if said request is denied, compressing said audio/video stream at a second level of compression different from said first level of compression.

13. The method of claim 12, further comprising performing a time synchronization for said connection.

14. The method of claim 12, wherein said audio/video stream is a video conference.

15. The method of claim 12, wherein said first endpoint device is a computing device.

16. The method of claim 12, wherein said requesting comprises requesting a reservation of connection bandwidth.

* * * * *